June 27, 1944.  L. W. BLAU ET AL  2,352,247
THERMAL WELL-LOGGING
Filed June 4, 1938
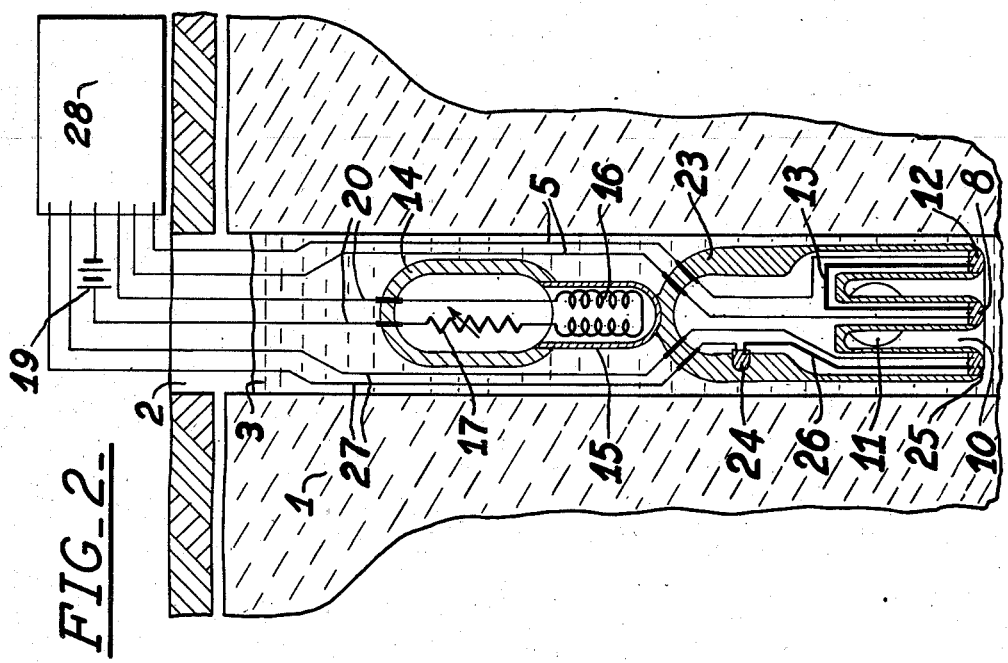
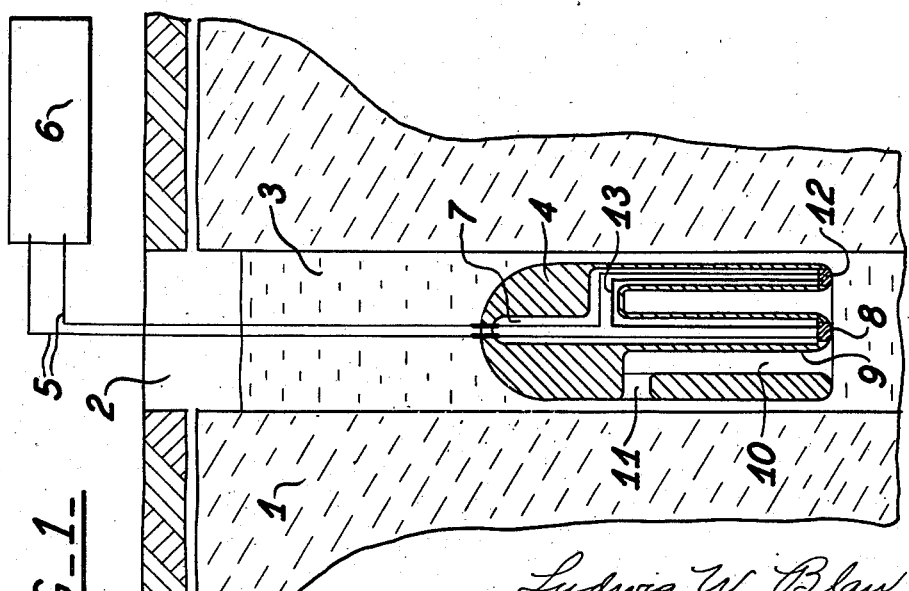
Ludwig W. Blau
George E. Cannon
INVENTOR.
BY P. L. Young
ATTORNEY.

Patented June 27, 1944

2,352,247

UNITED STATES PATENT OFFICE 2,352,247

THERMAL WELL-LOGGING

Ludwig W. Blau and George E. Cannon, Houston, Tex., assignors to Standard Oil Development Company, a corporation of Delaware Application June 4, 1938, Serial No. 211,726

3 Claims. (Cl. 73—51)

The present invention is directed to a method and apparatus for studying and differentiating between substrata traversed by a borehole. More particularly, the present invention resides in a method and apparatus for making thermal measurements in a borehole.

It has long been known that temperature increases with depth in a borehole, and that useful information concerning the nature of substrata traversed by the borehole can be obtained by making thermal measurements adjacent these substrata. In general, the procurement of this information has in the past been confined to the measurement of the temperature at various points along the borehole and to the measurement of the temperature differential between vertically spaced points in the borehole. The difficulty with this method is that it gives no certain indication of the nature of the substrata traversed by the borehole since the vertical gradient may be due to differences in temperature between successive strata without regard to the thermal characteristics of the substrata.

According to the present invention, more positive thermal data with regard to substrata traversed by a borehole are secured by measuring a value indicative of the thermal conductivity of the substrata traversed by the borehole, by measuring the horizontal gradient of temperature in the borehole, and/or the heat absorptive properties of the substrata traversed by the borehole. These measurements may be made independently or simultaneously and may be advantageously supplemented by the independent and simultaneous measurement of the vertical gradient of temperature in the borehole.

Briefly, the method of the present invention consists in circulating the fluid which is ordinarily contained in a borehole so as to remove from the borehole such fluid as may have reached the stage of thermal equilibrium with the substrata, and replacing this fluid with fresh fluid which is, in general, at a temperature different from the temperature of any of the substrata, allowing sufficient time to elapse for temperature changes to occur in the freshs fluid due to the heat contained in and the thermal conductivity of the various substrata, and then measuring the horizontal temperature gradient at successive points in the borehole, and/or measuring the heat absorptivity of the fluid at successive points. In making the latter measurements, one may proceed by passing a source of heat of constant temperature along the borehole and measuring the power necessary to maintain the temperature of said source constant, or passing along the borehole a source of heat supplied by a constant source of power and measuring the temperature changes of said source of heat.

The nature and objects of the present invention will be more fully understood from the following detailed description of the accompanying drawing in which—

Figure 1 is a diagrammatic illustration, partly in section, of an arrangement suitable for the measurement of the horizontal temperature gradient of the borehole fluid; and Figure 2 is a similar illustration of an arrangement which may be employed for measuring simultaneously the heat absorptivity of the borehole fluid, the horizontal temperature gradient of the fluid, and the vertical temperature gradient of the fluid.

Referring to Figure 1 in detail, numeral 1 designates the earth in which is a borehole 2 filled with a fluid, such as drilling mud 3. A body 4 of heat insulating material, such as Bakelite, is adapted to be lowered into the borehole on a cable, not shown, carrying conductors 5, which are connected across a voltage measuring device 6 at the surface.

The body 4 has a central passage 7 throughout its length which terminates in the lower end of the body in one junction 8 of a thermocouple. The lower end of passage 7 is surrounded by a cylinder 9 of small diameter which in turn is surrounded by an annular chamber 10 provided at its inner end with a laterally extending passage 11 connecting chamber 10 with the outside of body 4. The outer wall of annular chamber 10 is coextensive in length with the cylinder 9 and is provided at its lower edge with a second junction 12 of a thermocouple. Junctions 8 and 12 are connected by an iron wire 13, and are connected in series with the recording instrument 6 by conductors 5. The junctions 8 and 12 are exposed to the fluid in the borehole. There may be as many junctions 12 as desired arranged around the circumference of the lower edge of body 4, the voltage recorded being a function of the number of these junctions.

As can be seen, the junction 12 will assume the temperature of the fluid adjacent the borehole wall while the junction 8 will assume the temperature of the center of the column of fluid. The voltage recorded, therefore, will be a function of the temperature differential between the wall of the borehole and the center of the column of fluid. This differential will depend upon the conductivity of the wall of the borehole. Sometimes the borehole will be provided with casing, but this will have a uniform conductivity throughout its length and will, therefore, have no effect on the measurement of the horizontal gradient of temperature. As can be understood, if all of the substrata had the same conductivity, the temperature change would be the same throughout the length of the borehole, since, in general, the conductivity of the drilling fluid remains constant throughout the length of the borehole. Accordingly, variations in the potential created by the thermocouple can be attributed to the conductivity of the substrata traversed by the borehole.

In practicing the method of the present invention with the apparatus above described, the cable carrying the body 4 is mounted on a drum at the surface in the conventional manner. The body 4 is lowered through the borehole at a regulated constant speed. As the body 4 passes downwardly the drilling fluid in the borehole passes through annular passage 10 and passage 11 thereby insuring that the junction 8 will follow the variations in temperature along the center of the borehole. The voltage measuring instrument is, preferably, of the recording type and is used in conjunction with a moving strip of photosensitive paper in the manner conventional in well-logging methods.

In the event that it is desired to observe and record simultaneously the heat absorptivity of the substrata, the horizontal temperature gradient along the borehole and the vertical temperature gradient along the borehole, an arrangement such as shown in Figure 2 may be employed. In this arrangement the body 14, containing the heating coil 16 and the thermostat 17, is rigidly secured to the body 4 shown in Figure 1. The body 4 contains, in addition to the arrangement of the thermocouple employed to measure horizontal temperature gradient, a cylinder of metal 23 arranged in its upper end. This metal has a high heat capacity and is insulated from the borehole fluid by body 4. One junction 24 of a thermocouple is embedded in this cylinder of metal. The other junction of this thermocouple is exposed at the lower end of the body 4 and is designated by numeral 25. Junctions 24 and 25 are connected by an iron wire 26 and are also connected by conductors 27 to a voltage recording instrument at the surface. At the surface will be an instrument for recording the voltage created by thermocouples 8 and 12, an instrument for recording the voltage created by thermocouples 24 and 25, and an instrument for measuring the energy lost from the heating coil 16. These instruments are conventional in the art and are designated collectively by numeral 28.

The nature and objects of the present invention having been thus described and illustrated, what is claimed as new and useful and is desired to be secured by Letters Patent is:

1. A method for determining the nature of substrata traversed by a borehole filled with a fluid which comprises measuring the horizontal temperature gradient between the center and the wall of the borehole at successive points along the borehole.

2. An apparatus for making temperature measurements in a borehole comprising a body adapted to be lowered into the borehole, said body having a portion adapted to traverse the borehole adjacent the walls thereof and a portion adapted to traverse the center of said borehole, thermocouple junctions exposed on each of said portions and means adapted to be located at the surface and electrically connected to said junctions to record a value indicative of the temperature difference between them.

3. An apparatus for making temperature measurements in a bore hole comprising a body adapted to be lowered into the bore hole, said body having a portion adapted to traverse the bore hole adjacent the walls thereof and a portion adapted to traverse the center of said bore hole, thermocouple junctions exposed on each of said portions and positioned in the same horizontal plane in said apparatus, and means adapted to be located at the surface and electrically connected to said junctions to record a value indicative of the temperature difference between them.

LUDWIG W. BLAU.
GEORGE E. CANNON.